United States Patent [19]

Heilhecker et al.

[11] 4,319,410
[45] Mar. 16, 1982

[54] DRYER SYSTEM FOR DRILLING MUD CUTTINGS

[75] Inventors: Joe K. Heilhecker; David D. Schoeneman, both of Houston, Tex.

[73] Assignee: The Brandt Company, Houston, Tex.

[21] Appl. No.: 162,409

[22] Filed: Jun. 24, 1980

[51] Int. Cl.³ .......................................... F26B 11/14
[52] U.S. Cl. ........................................ 34/75; 34/183;
    34/92; 34/242; 175/207; 202/136; 208/186; 422/900
[58] Field of Search .................. 175/206, 207, 66;
    134/19; 201/7, 8, 35, 10, 11; 202/105, 136;
    422/309, 900; 34/75, 242, 92, 183; 431/173;
    208/184, 186

[56] References Cited

U.S. PATENT DOCUMENTS

| | | | |
|---|---|---|---|
| 3,302,300 | 2/1967 | McClead | 34/75 |
| 3,554,038 | 1/1971 | Sweeney et al. | 34/242 |
| 3,693,951 | 9/1972 | Lawhon et al. | 134/19 |
| 3,857,672 | 12/1974 | Reed | 431/173 |
| 4,139,462 | 2/1979 | Sample, Jr. | 175/206 |
| 4,208,285 | 6/1980 | Sample, Jr. | 175/206 |
| 4,209,381 | 6/1980 | Kelly, Jr. | |
| 4,222,988 | 9/1980 | Barthel | 175/66 |

OTHER PUBLICATIONS

OB Cuttings Cleaner, Sales Brochure, Date Available to Public Believed to be 1978.
Chemical Engineers Handbook–5th Edition–Perry & Chilton–(1973), McGraw-Hill Publication, (pp. 20–45, 20–46, 20–47).

*Primary Examiner*—Larry I. Schwartz
*Attorney, Agent, or Firm*—Vaden, Eickenroht, Thompson, Bednar & Jamison

[57] ABSTRACT

A dryer system for treating oily solids, such as oil based drilling mud cuttings, into dry and oil-free solids and a liquid which includes recovered oil values. The system is a continuous feed, high vacuum, low temperature, distillation unit. An indirect heat exchanger may also be employed. The dry solids can be discharged continuously through a water standpipe, venturi type eductor or other continuous solids discharge arrangement. The dry solids are oil-free sufficiently to allow discharge into public waters without a rainbow effect. The recovered liquid includes the oil base and chemicals in a state permitting reuse directly in formulation of additional amounts of the oil based drilling mud, or other employment such as a fuel for heating the distillation unit.

In one embodiment, the present dryer system is especially useful for installation on offshore drilling platforms.

34 Claims, 14 Drawing Figures

DRYER SYSTEM FOR DRILLING MUD CUTTINGS

BACKGROUND OF THE INVENTION

1. Field of the Invention

This invention relates to the purification and separations of liquids and solids and more particularly, it relates to apparatus and process for the treatment of oil wet solids to produce oil-free solids and a recovered liquid having oil values.

2. Description of the Prior Art

The drilling of wells into subterranean formations for the recovery of valuable materials such as petroleum is relatively expensive, both as to the equipment employed in the drilling procedures and in the corollary activities to insure that the environment of the area surrounding the well is not injured. In the drilling of wells for the production of petroleum, large amounts of drill cuttings are produced and carried by the circulating mud that passes through the drilling equipment and then is returned to the earth's surface. At the earth's surface, the drill cuttings are separated from the drilling mud through the use of various mechanical solids control equipment such as, screens, shakers, solid-separators, desanders, mud cleaners, desilters and the like. The drill cuttings from a petroleum formation will contain petroleum or oil, both in suspension and also adhering to the solids separated from the drilling mud. In addition, it is common practice to employ an oil based drilling fluid. The drill cuttings produced by an oil based drilling fluid are rather heavily contaminated by the oil base which is used for preparing the drilling fluid. For example, the drill cuttings separated from the returning drilling mud from such a well drilling operation, may contain 40% by volume of oil carried by the drill cuttings.

The oily drill cuttings can not be discharged directly into a disposal site at the well not only because of their adverse effect upon the environment, but additionally, because the great value of the oil contained in them. It has been a common practice to treat the oil drill cuttings in order to produce a solid material that can be disposed into the environment surrounding the well site without injury to it. One method of treating these oily drill cuttings has been through the use of a chemical washing system. In this system, the oily drill cuttings are treated with various chemicals including detergents with relatively intense mixing. Then, this mixture is resolved into relatively oil-free solids (i.e., the drill cuttings) and a recovered liquid phase which is a mixture of water, oil and the detergents which were employed in the chemical wash system. The solids could be disposed by burial or other means. However, these solids may contain sufficient oil that upon contact with bodies of water, such as surface waters, lakes or the ocean, there will be produced a rainbow effect which is unacceptable relative to preserving the environment in the best possible form. In addition, the liquid phase must be treated to separate the oil from the bulk water phase so that the water portion can be discharged or otherwise disposed without pollution problems. The separated oil can be utilized for various uses such as fuel or be returned into the blending of additional oil based drilling muds and the like.

One objection to the chemical wash system, is its relatively high cost in the amount of above several hundred dollars a day, merely from the chemical requirements.

The chemical wash system is described in U.S. Pat. Nos. 2,266,586, 3,860,019, and 3,766,997. Other methods have been proposed to purify the oily drill cuttings into a solid material that can be disposed of without injury to the environment. For example, various thermal systems for driving the oily phase from the solids of the drill cuttings through the use of thermal energy has been proposed. For example, a type of incineration process can be employed such as described in U.S. Pat. Nos. 3,693,951, 2,266,586 and 4,139,462. In the later patent, the oily drill cuttings are passed through a chamber which is continuously flooded with an inert fluid such as nitrogen gas. The cuttings are heated to elevated temperatures above 500° F. for extended periods of time. Then, these heated cuttings are moved through the chamber until all the volatile materials are vaporized to leave an oil-free solids residue which could be disposed safely in the environment. This thermal procedure is relatively expensive, in that it requires large amounts of an inert gas to prevent internal explosions by the contact with air of the heated solids at excessive temperatures. The relatively large amounts of the inert gas complicate the recovery of liquid materials from the chamber because of the undesired high levels of gas flow into condensers and the like.

The greatest disadvantage in this particular procedure for treating oily drill cuttings, is the danger of explosions in the system should air or other oxidizing gas enter into contact with the heated oil vapors produced by the excessive heating of the oily drill cuttings. Should the flow of inert gas be terminated through accident or inadvertence, air entering in contact with these oily vapors could produce a very serious explosion and fire. Such an arrangement, is not acceptable in the area surrounding an oil well, especially while it is being drilled.

The above described prior procedures for treating oily drill cuttings have other serious disadvantages, especially when they are to be employed on offshore drilling platforms. For example, large amounts of chemicals must be transported at great expense to offshore facilities. In addition, these offshore platforms do not have any surplus of steam, gas, electrical or other energy sources. Thus, a procedure for treating the oily drill cuttings must be self-sufficient relative to the operations on the offshore platforms. Stated in a different manner, the treatment procedure for oily drill cuttings must not place any burden upon the facilities of the offshore platform. In addition, the treatment procedure for the oily drill cuttings must be safe in operation, not require excessive operator time, operate without interference or hindrance to the drilling operations conducted on the offshore platform while yet producing an oil-free solids from the drill cuttings which can be disposed of safely and without any injury to the environment at the drilling site. In addition, the system for the treatment of oily drill cuttings at the drilling site, and especially on an offshore platform, must not require a constant supply requirement of chemicals, fuel, nitrogen or other materials for its operation.

The present dryer system is arranged to satisfy all of the requirements for use in connection with the drilling of an oil well, and especially in connection with its placement upon an offshore platform, without the disadvantages of the prior art and in addition, providing for self-sufficient operation with minimum operator attention, and absolute fail-safe operation.

SUMMARY OF THE INVENTION

In accordance with this invention, there is provided a dryer system for converting oily drill cuttings separated from oil base drilling muds into pollution-free solids and an oil based liquid. The system has an elongated vacuum distillation chamber with an inlet at one end and an outlet at the other end. Feed means are provided for continuously introducing the cuttings through a vacuum lock into the inlet of the chamber. Conveyor means in the chamber move the cuttings from the inlet to the outlet while insuring their continuous agitation. The chamber is surrounded by indirect heat exchanger means through which is passed a heated fluid in a direction from the outlet to the inlet ends of the chamber. As a result, the cuttings within the chamber are heated to a substantially elevated temperature without thermal cracking of the hydrocarbon values carried by the oily drill cuttings. The fluid pressure within the chamber is reduced by a vacuum means to a magnitude sufficient to vaporize substantially all of the hydrocarbons carried upon the oily drill cuttings at the moderate temperature conditions established at the outlet end of the chamber. The vacuum means also provide for recovering the fluids from the outlet of the chamber so that the vaporized liquid components flow concurrently with the cuttings towards the outlet of the chamber. The heated cuttings in a hydrocarbon-free condition are removed continuously from the chamber at its outlet through a vacuum lock. The vaporized hydrocarbons and other condensibles are passed through a heat exchanger and condensed and then collected in a receiver means as a liquid product. The liquid product may be readily separated into a oil phase and a water phase, if desired.

In one embodiment of the present dryer system, the drill cuttings are heated to an elevated temperature not in excess of about 450° F. under a reduced pressure of about 28 inches of mercury below atmospheric. The drill cuttings reside within the chamber for less than about five minutes. As a result, the hydrocarbons and other condensibles arising from an oil base drilling mud include the detergents or surfactants and other chemical additives which were carried originally in this mud. These hydrocarbons and chemicals may be returned directly into formulation of additional quantities of oil base drilling muds since neither hydrocarbon nor chemical suffered thermal degradation during passage of the cuttings through the chamber of the dryer system.

DESCRIPTION OF PREFERRED EMBODIMENTS

Figure 1:
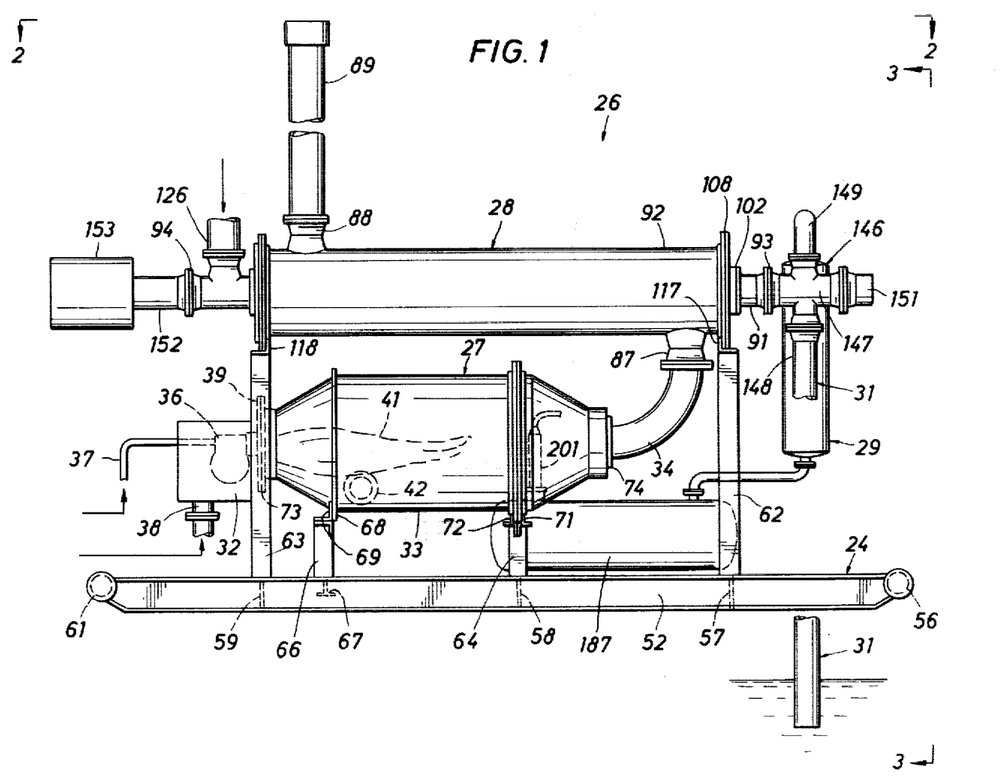
FIG. 1 is a side elevation of the present dryer system arranged for installation upon an offshore drilling platform.
Figure 2:
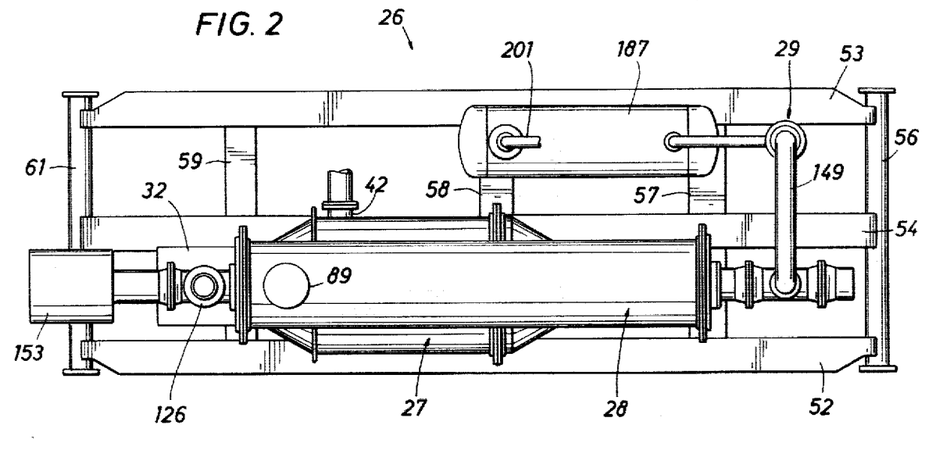
FIG. 2 is a plan view of the dryer system of FIG. 1.
Figure 3:
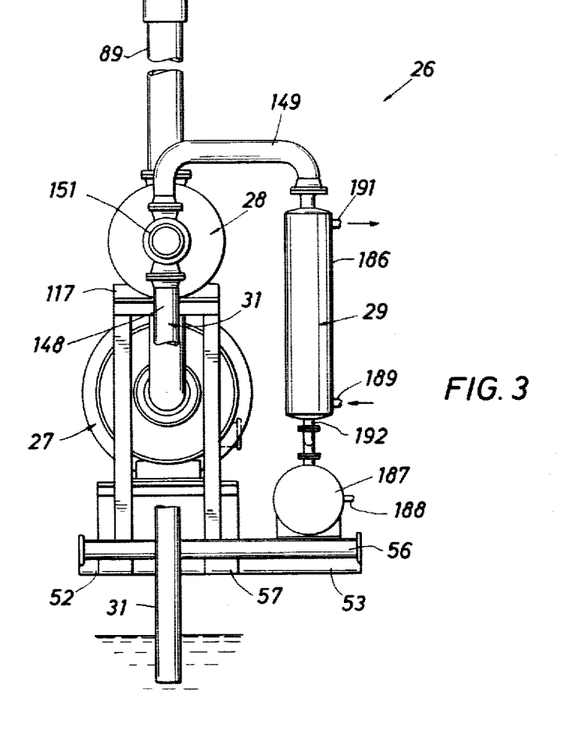
FIG. 3 is an end elevation of the dryer system shown in FIG. 1.

Referring now to FIGS. 1, 2 and 3, there is shown one embodiment of the present dryer system 26. The dryer system 26 includes on a support 24 several basic operative units which can be generally designated as the heating unit 27, a vacuum distillation unit 28, a hydrocarbon recovery unit 29, and a solids discharge unit 31. It will be apparent that each of these units are comprised of several different operative elements which will be described in more detail hereinafter.

The heating unit 27 provides for the generation of heat exchanger fluid, such as heated air at elevated temperatures, which is passed to vacuum distillation unit 28 so that the oily drill cuttings contained in it can be heated to sufficient temperatures for the vaporization of their oil values. The vacuum distillation unit 28 includes several elements which convert a continuous feed of oily drill cuttings into oil-free solids which are passed continuously to a suitable disposal. The vaporized oil and other condensibles are sent to the hydrocarbon recovery unit 29. The solids are sent to a suitable discharge through the use of the solid discharge unit 31.

The heating unit 27 is comprised of a burner housing 32, a firebox 33, and an outlet 34 which carries heat exchange fluid at elevated temperatures to vacuum distillation unit 28. More particularly, the burner housing 32 includes an internal forced draft burner 36, which receives a supply of fuel, such as diesel oil, through an inlet 37 and a supply of burner air through an inlet 38. The burner housing 32 is so arranged as to be segregated from firebox 33 by a flange 39. The burner 36 is adapted to employ a variety of fuels, but preferably, it will be supplied the recovered hydrocarbon from the oily drill cuttings after its separation in the present dryer system 26. However, burner 36 may be operated upon another oil supply or until the present dryer system is operating for a sufficient period of time to generate enough recovered oil to be self-sufficient. The oil base drilling mud which has generated the oily drill cuttings will be based upon a diesel oil. This hydrocarbon material is recovered in a sufficiently pure state through operation of the present dryer system so as to provide an adequate fuel for burner 36. In operation of burner 36, there is generated a flame 41 which extends longitudinally into firebox 33.

In accordance with the present embodiment, the flame 41 is quenched by a tangentially introduced stream of air. For this purpose, a flow of quench air is supplied to firebox 33 by an inlet 42. The flow of quench air through inlet 42 passes in a tangential path about flame 41 provides for complete combustion of the hydrocarbon feed material. In addition, the quench air provides for lowering the flame temperature of about 2200° F. to a heated gas temperature at about 900° F. that is below the auto ignition temperature of any hydrocarbon material likely to be found upon the drilling site where the present dryer system is employed. For example, the most common hydrocarbon in the vacinity of the dryer system will the diesel oil used in the oil base drilling mud. Generally, it is desired to maintain the heated gas flowing from firebox 33 into outlet 34 at temperatures of less than about 1000° F. At these temperatures, auto ignition of hydrocarbons can not occur by contact with the heated gases.

Figures 11, 12:
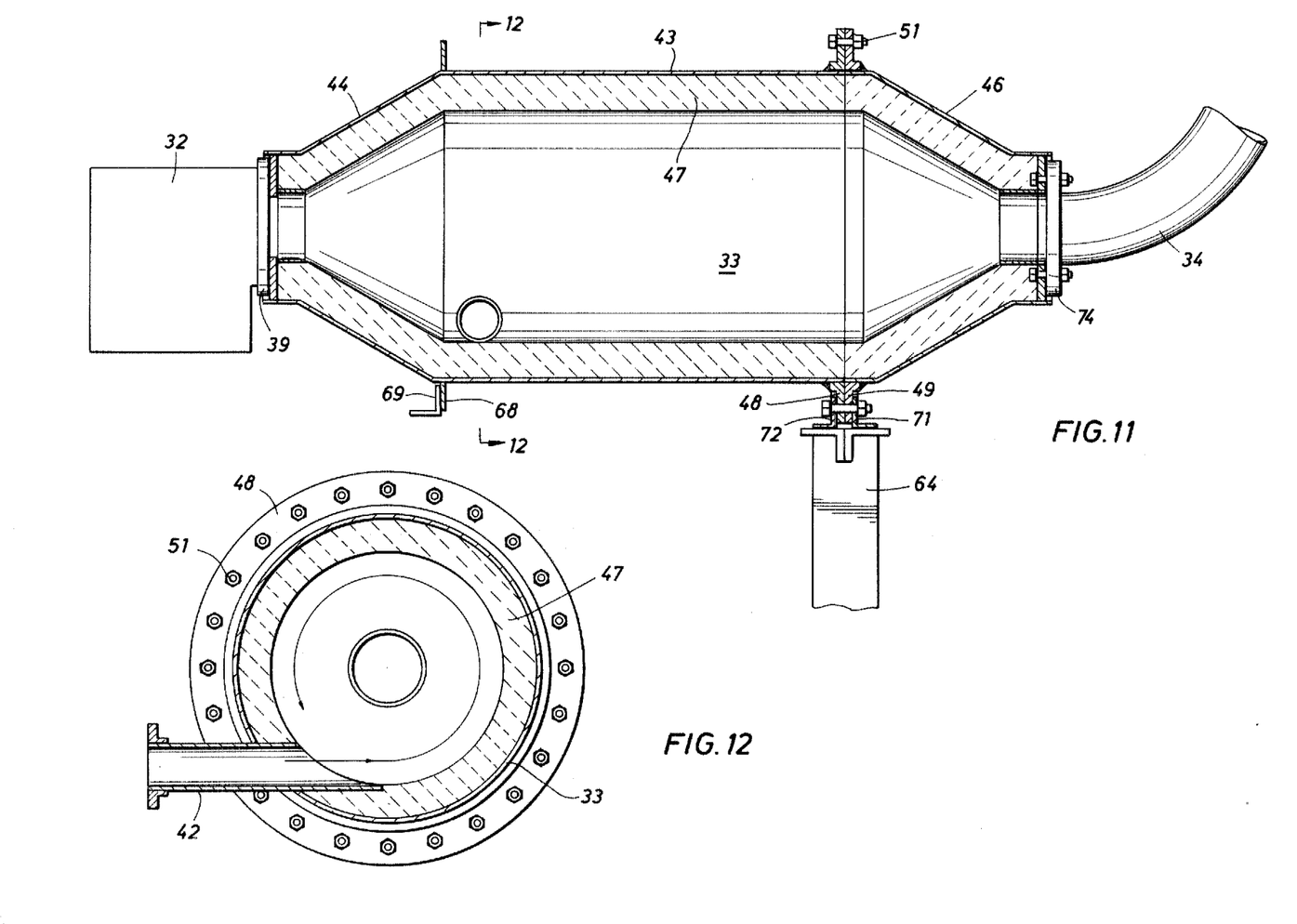
FIG. 11 is a longitudinal section taken through the firebox assembly in the dryer system illustrated in FIG. 1.
FIG. 12 is a cross-section taken through the firebox in the dryer system and illustrating a tangential air inlet for quenching the flame generated by the burner illustrated in FIG. 1.

The tangential entry of the quench air through the inlet 42 can be seen in more detail in reference to FIGS. 11 and 12. Firebox 33 is constructed with a central cylindrical section 43 and frustoconical ends 44 and 46. The outer covering of firebox 33 may be steel sheeting. The interior of firebox 33 is covered by a fire brick or heat retardant insulation 47. It will be apparent that inlet 42 must pass through insulation 47 and open to the interior of firebox 33. The conical ends may be joined to the cylindrical section 43 by the use of a pair of mating flanges 48 and 49 or by welding. The flanges 48 and 49 are provided with bolts 51 so that the end 46 of firebox 33 may be readily detached for inspection, repair and assembly.

The burner housing 32 can be secured to one end of firebox 33 and outlet 34 may be secured to the other end of firebox by bolts in conjunction with the mounting of heating unit 27 to the support system for dryer system 26.

The dryer system 26 may include a platform 24 comprising parallel skids 52, 53 and 54, which are interconnected by transversed bracings 56, 57, 58, 59 and 61. The cross bracings may be beams or tubular members, as is desired. Master upright supports 62 and 63 may be carried upon the cross bracings 57 and 59. Additionally, auxiliary upright supports 64 and 66 may be carried upon cross bracing 58 and auxiliary cross bracing 67. The firebox 33 is mounted by welding to upright support 66 by a peripheral flange 68. In a like manner, flanges 48 and 49 are bolted to saddles 71 and 72 carried upon the auxiliary support 64. In addition, firebox 33 is secured to the support 63 by bolts which extend longitudinally through holes (not shown) in flanges 39 and 73 carried upon burner housing 32 and firebox 33. In a like manner, the end of firebox 33 adjacent to the conical end 46 is secured by bolts to a flange 74 carried at the adjacent end of outlet 34. With this arrangement, the firebox 33 is securely mounted upon the skid platform 24 forming a convenient support for dryer system 26.

Figure 8:
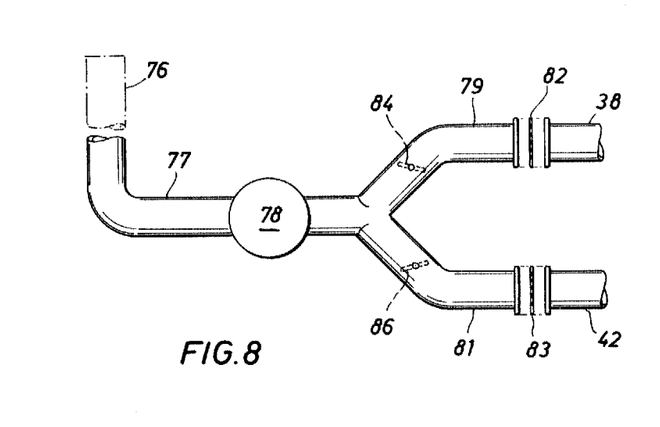
FIG. 8 is a schematic illustrating the air flow system employed in the present dryer system.

The sources of burner air and quench air supplied to inlets 38 and 42 respectively, of the heating unit 27 are shown in FIG. 8. A location for the air to be supplied to dryer system 26 is selected on the well site so as to be relatively removed from any possible sources of hydrocarbon vapor or other explosive gasses. Also, the inlet to the air system will be placed at a location that is convenient to the dryer system. For this purpose, there is provided an air inlet 76 which includes a flame suppressor screen. The flame suppressor at the inlet 76 insures that a flame front can neither travel into inlet 76, nor pass outwardly of the air system to the surrounding atmosphere. The inlet 76 is connected through a flexible conduit 77 to the inlet of a blower 78. The outlet of the blower diverges into separate outlets 79 and 81 that are interconnected through screentype flame arresters 82 and 83 to burner air inlet 38 and quench air inlet 42, respectively. Preferably, the speed of blower 78 is adjusted to produce a certain total quantity of air flow to heating unit 27 while the actual division of the air flows is set by adjustable damper valves 84 and 86 in the conduits 79 and 81, respectively. With this arrangement of the air inlet, the burner housing 32 and the firebox 33 receive the necessary air flows for the purposes of heating unit 27.

The heated fluid, at the desired elevated temperature, flows from outlet 34 into the vacuum distillation unit 28 of present dryer system 26 as can be seen in FIGS. 1—3. The heat exchange fluid enters the vacuum distillation unit 28 at inlet 87 and passes in indirect heat exchange relationship to the oily cuttings contained therein. Then, the fluid is removed from the unit 28 through an outlet 88 into a vent stack 89 for discharge into the atmosphere. If desired, the heat exchange fluid may be recovered from the vent stack 89 and recirculated for recovery of its sensible heat in a suitable heat exchange system.

Figure 9:
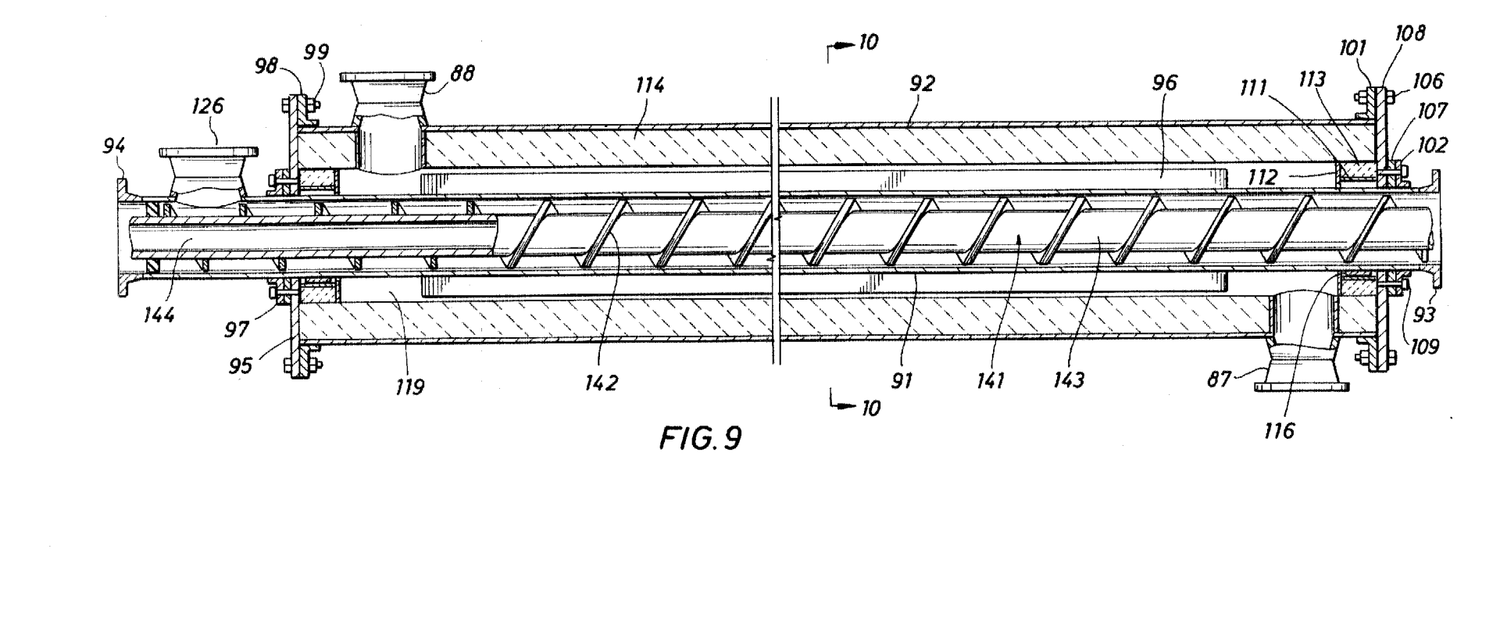
FIG. 9 is a longitudinal section taken through the vacuum distillation chamber of FIG. 1, and this view illustrates the screw conveyor and heat exchanger jacket employed in the present dryer system.
Figure 10:
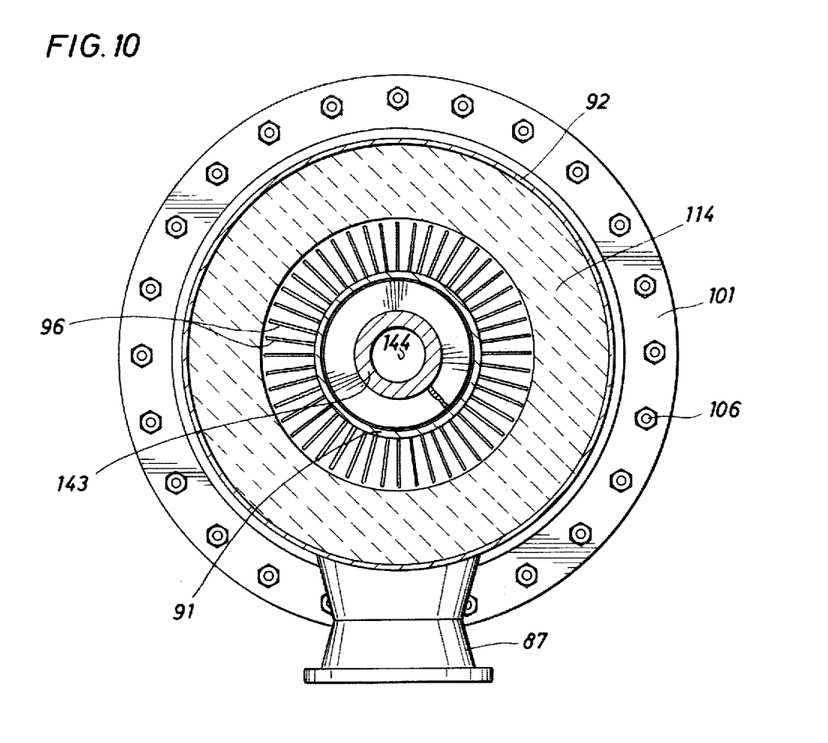
FIG. 10 is a cross-section of the vacuum distillation chamber in the dryer system shown in FIG. 1, and this view illustrates the radial fins surrounding the vacuum distillation chamber.

Referring to FIGS. 9 and 10, in conjunction with the FIGS. 1, 2 and 3, it will be seen that the vacuum distillation unit 28 is comprised of an auger housing 91 located within a heat exchanger jacket 92. The auger housing 91 can be formed of an elongated tubular member which carries at its ends flanges 93 and 94 to permit ready interconnection to the inlet and outlet elements associated with the feeding and discharge of the drill cuttings, solids and vapors. Preferably, the auger housing 91 carries a plurality of longitudinally extending radial fins 96 which provide several desirable functions. The fins 96 provide a spacer relative to the jacket 92 and increased surface area for indirect heat exchange with the heat exchange fluid provided by heating unit 27. In addition, these fins provide for stiffening the auger housing 91 against distortion by thermally induced stresses and to increase its rupture resistance in the event of excessive internal pressure. The jacket 92 surrounds substantially a major portion of the longitudinal extent of auger housing 91. However, the ends of jacket 92 are sealed to the auger housing 91. For this purpose, the auger housing 91 carries a flange 97 which may be secured, such as by welding, adjacent its inlet end. The heat exchanger jacket 92 carries a rim flange 98 at its end which can be secured by intermediate flange 95 to flange 97 by bolts 99. The flange 95 is split horizontally into upper and lower halves to facilitate assembly about the auger housing 91. During assembly, the heat exchanger jacket 92 is telescoped over the outlet end of auger housing 91. Then, the flange 95 is seated against flange 97 and secured to it by bolting against the flanges 97 and 98.

The outlet end, of jacket 92, carries a rim flange 101 which is likewise secured by flanges to auger housing 91. For this purpose, a split flange 102 is employed, which has a horizontal parting line to permit separating same into upper and lower halves. An intermediate flange 108 fits between the flanges 101 and 102. The flange 102 has complimentary openings to flanges 101 and 108 and they may be secured together by bolts 106 and 109. A fluid-tight joint may be provided against the auger housing 91 by placing a packing gland (not shown) upon the interior cylindrical surface of flange 102. As a result, this packing gland provides a longitudinal slidable seal between the jacket 92 and the auger housing 91. The packing gland preferably, is formed of asbestos or other inert thermally resistant material.

It is preferred to mount auger housing 91 within the heat exchanger jacket 92 by saddle mounts which provide for a sliding support between these members. Both ends of the auger housing 91 may be supported by these saddle mounts. These saddle mounts can be of similiar construction, and therefore, only the saddle mount associated with the flange 108 will be described in detail. For this purpose, the flange 108 on its rearward face carries cylindrical spacer 111 which is secured to an annular member 112. The exterior surface of the spacer 111 is surrounded by an insulating medium 113. The exterior of member 112 and insulator 113 are arranged in dimension to be received within the interior of heat exchanger 92 which carries a sheath of insulating material 114. Preferably, auger housing 91 rests upon a semicylindrical saddle 116 which is secured to spacer 111. With this arrangement, the stress of the mass and the movement of auger housing 91 is taken by saddle 116 and distributed through spool spacer 111 to flange 108. The spacer 111, annular member 112, and insulator 113 are split horizontally with their upper and lower halves carried, respectively, by the upper and lower halves of the flange 108.

The heat exchanger jacket 92 carrying auger housing 91 is mounted to the supports 62 and 63. For this purpose, the supports 62 and 63 carry saddles 117 and 118, which are bolted to flanges 95 and 108 at the ends of the heating jacket.

With the described arrangement of heat exchanger jacket 92, the heat exchange fluid from heating unit 27 flows through the annulus 119 about auger housing 91. Oily drill cuttings passing through auger housing 91 are heated to an elevated temperature by the heat exchange fluid flowing through the annulus 119. Although the heat exchange fluid can be at temperatures of about 900° F., the mass of the cuttings moving through the auger housing 91 combined with heat losses etc., will limit the maximum temperature of the dry solids to about 450° F. Temperatures in these solids above this magnitude are not desired because they induce thermal degradation of hydrocarbons, surfactants and other oil based mud components.

Preferably, the maximum temperature of the solids in the auger housing 91 is held between about 350° F. and 450° F. for good results in the present dryer system 26. With this operation, the residence time of these solids during heating preferable is less than five minutes. Residence time in excess of five minutes tends to induce undesired thermal degradation in the oil values recovered from the drilling cuttings subjected to treatment.

Figure 7:
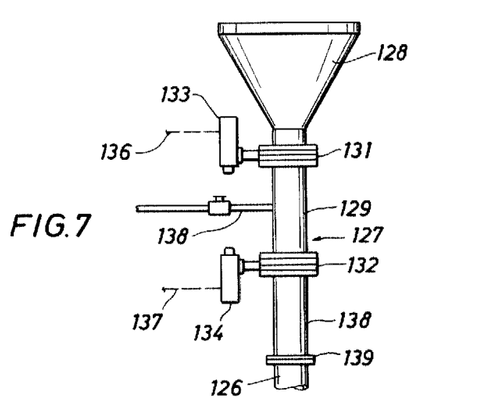
FIG. 7 is a partial elevation of an inlet system employing a pair of operating valves for the continuous introduction of cuttings into the present dryer system.

Referring momentarily to FIG. 7, a continuous cutting feeding system is shown which can continuously introduce the oily drill cuttings into the inlet 126 of auger housing 91 even though it is below atmospheric pressure.

The cutting feeding system 127 comprises a hopper 128 which receives the oily drill cuttings from the drilling site. Usually, these oily drill cuttings are provided by the output of the solids control equipment which processes the drilling mud preparatory to its recirculation downhole in the well drilling operations. The cuttings are introduced into the hopper 128 by any means, such as a screw feeder. The oily drill cuttings within the hopper 128 gravitate downwardly through a vacuum lock for introduction into the inlet 126. More particularly, the vacuum lock comprises a spool piece 129 which carries at its ends a first motor valve 131 and a second motor valve 132. The valve 132 is connected by conduit 138 at its flange 139 to the inlet 126. The valves 131 and 132 are arranged to be operated by a suitable arrangement such as motor actuators 133 and 134, respectively. These actuators can operate the valves pneumatically responsive to eletrical signals indicated by the chain lines 136 and 137. Preferably, the actuators include accumulators to close the valves in a fail-safe mode. In addition, the spool piece 129 is connected to a source of reduced pressure or vacuum by a nipple 138. With valves 131 and 132 closed and vacuum applied through nipple 138, the spool piece 129 is evacuated to the reduced pressure existing within auger housing 91.

In normal operation, valve 132 remains closed whenever valve 131 is open so that the cuttings fall from hopper 128 into spool piece 129. At this time, valve 131 is closed and spool piece 129 is evacuated through nipple 138. With the pressure reduced within spool piece 129 to substantially that existing within auger housing 91, valve 132 can be opened. Now, the cuttings move from spool piece 129 into inlet 126 for passage through auger housing 91. After the cuttings are discharged into inlet 126, the valve 132 is closed and the valve 131 is opened to receive another charge of oily cuttings. The storage capacity for cuttings is sufficiently large within inlet 126 and the innerconnecting conduit 138 that a continuous feed of oily cuttings moves into auger housing 91 during cycling of the valves 131 and 132. Other arrangements for providing a continuous feed of oily drill cuttings through the inlet 126 into auger housing 91 can be employed, if so desired.

Returning now, to FIGS. 1 and 9, auger housing 91 contains a conveyor for moving the cuttings from inlet 126 to an outlet system 146 which connects to flange 93. More particularly, the conveyor can be a screw or auger 141 which contains a spiral 142 which encircles a cylindrical member 143. Preferably, the member 143 has an axial passageway 144 which extends through its length. If desired, a fluid can be passed through the passageway 144 to assist in heating or cooling the cuttings in the auger housing 91. As screw 141 is rotated, the cuttings pass in a helical path through auger housing 91. The annulus between member 143 and the interior of auger housing 91 is relatively small so that the cuttings are moved continuously and efficiently in direct contact with the interior surface of auger housing 91 and thereby, promote efficient heat transfer. As the oily drill cuttings traverse auger housing 91, they are heated in the reduced pressure environment which causes the release of volatile liquids including the oil values derived from the oil base drilling mud, and water or other condensibles. The drill cuttings that reach the outlet system 146 are in a substantially dry condition, and free of any significant hydrocarbon values. The volatized materials move concurrently with the drill cuttings into the outlet system 146.

The outlet system 146 discharges the dry, oil-free drill cutting solids from the dryer system 26. Also, the vaporized oil and other condensible materials are removed through the outlet system 146. For this purpose, the outlet system 146 includes a four way cross 147 which is connected to flange 93. The cross 147 connects to a conduit 148 for the discharge of the solids into discharge unit 31, a conduit 149 for the carrying of vaporized material to the recovery unit 29, and the remaining opening is connected to a closed housing 151 which provides for the journaling of screw 141 and provides a rotary vacuum seal on auger member 143.

In a like manner, the other end of screw feeder 141 extends through flange 94, and a housing 152 which provide the journal and rotary vacuum seal for the inlet end of auger member 143. In addition, a screw drive unit 153 is connected to the end of member 143 that extends through the housing 152. The screw drive unit 153 can be an electrical motor.

The dry solids produced by the present dryer system are passed through the cross 147 and gravitate downwardly into the solids discharge unit 31. Several novel mechanisms are provided in the present dryer system 26 to permit the continuous discharge of the dry solids without disturbing the reduced vacuum conditions within auger housing 91.

Figure 4:
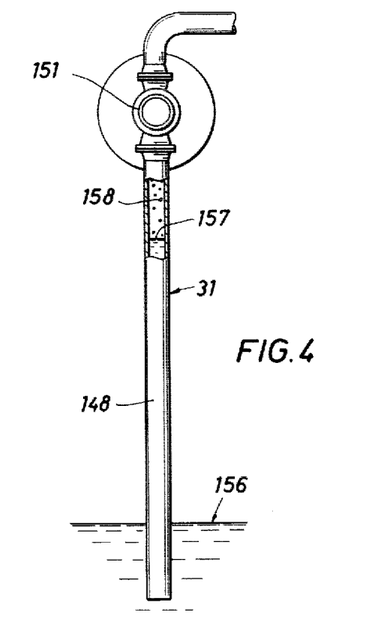
FIG. 4 is a partial elevation of a water standpipe providing for the continuous discharge of solids from the present dryer system.

A first embodiment of the solid discharge unit 31 is shown in FIG. 4. In this particular arrangement, the pipe 148 extends downwardly from the cross 147 into a body of water 156 which may be the ocean surrounding the drilling platform. For this purpose, pipe 148 should have a length of about 35 feet between cross 147 and the highest mean tide level of the body of water 156. At the preferred operating conditions of reduced pressure within auger housing 91, as for example, 28 inches of mercury below atmospheric pressure, the water rises within pipe 148 to a height 157 of approximately 30–31 feet. The water height 157 is maintained and automatically adjusted to respond to even a slight variation of the reduced pressure within the auger housing 91. The hot, but dry, solids 158 fall from the cross 147, downwardly into the water contained within pipe 148. Since the gravity of these dry solids is much greater than that of the water, they will gravitate downwardly and fall into the body of water 156 for a convenient disposal. The residual hydrocarbon content of these solids is so low that no rainbow can form on the body of water 156. In this regard, the oil-free solids have an oil content by chemical analysis that is 25 fold reduced beyond the best reduced oil content that can be achieved by prior art systems including the most exacting chemical treatment practiced in present-day, oil well drilling practices. This arrangement of the solids discharge unit 31, provides for a convenient, continuous and automatic disposal for the dry and oil-free solids produced by dryer system 26.

Figure 5:
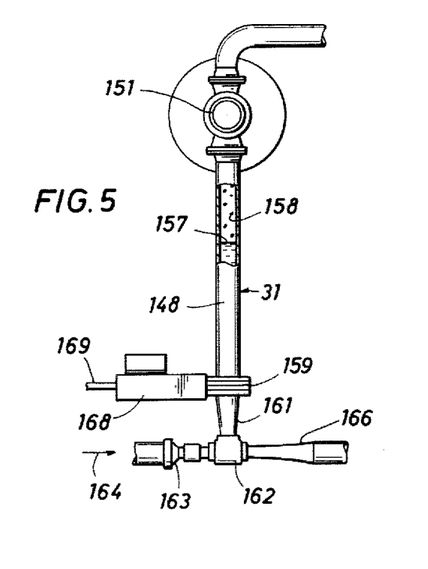
FIG. 5 is a partial elevation of a combination of a water standpipe and a water powered venturi for the continuous discharge of solids from the present dryer system.

Referring to FIG. 5, there is shown another arrangement for the continuous discharge of hot, dry and oil-free solids from auger housing 91. In this case, pipe 148 is connected through a motor valve 159 to the inlet 161 of a venturi or eductor 162. The inlet 163 of the venturi receives a flow of water 164. The water passing through the venturi 162 is removed through an outlet 166. The eductor 162 is operated with a suitable flow of water (e.g. 35 psig at the inlet 163) so as to produce a reduced pressure condition at its inlet 161 of approximately 26 inches of mercury. Then, the length of pipe 148 extending from cross 147 to motor valve 159 should be at least 8 feet. If auger housing 61 is operating at a reduced pressure of approximately 31 feet of water, water rises to a height 157 of approximately 6 feet above eductor 162 within pipe 148. Thus, height 157 reflects exactly the reduced pressure condition within auger housing 91. The solids 158 fall downwardly in pipe 148 and merge into the water column therein. These solids pass downwardly, continuously into inlet 161 and are discharged from the eductor 162 by the flow of water into outlet 166 for their disposal to any suitable place, such as water body 156. Preferably, motor valve 159 is operated by a pneumatic actuator 168, which valve can be opened and closed by a remote electrical signal as indicated by the numeral 169. As a result, a failure of some feature or control function within present dryer system 26 closes the motor valve 159 by a suitable signal 169 and the actuator 168 provides the necessary valve closing function.

Figure 6:
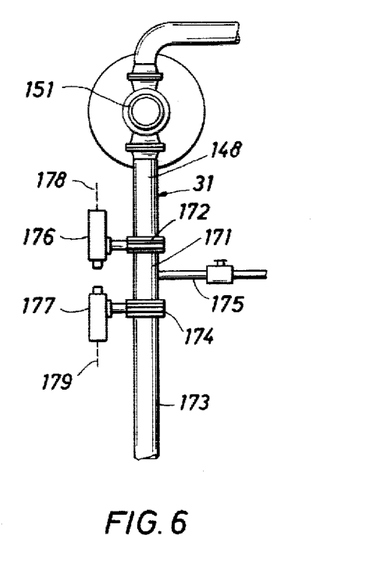
FIG. 6 is a partial elevation of a discharge system employing a discharge pipe outlet including a pair of operating valves for the continuous removal of solids from the present dryer system.

Another arrangement for the continuous discharge of solids from auger housing 91 is illustrated in FIG. 6. This arrangement is in close resemblance to that described for the cuttings system 127 shown in FIG. 7. In this arrangement, the pipe 148 is connected to a spool piece 171 through a first motor valve 172 and to a discharge pipe 173 by a second motor valve 174. The spool piece 171 is connected by a valve and nipple 174 to a vacuum source. The valves 172 and 174 are operated by pneumatic actuators 176 and 177 which are controlled by remote electrical signals 178 and 179. These valves 172 and 174 can be the same arrangement as valves 131 and 132.

With this arrangement, valves 172 an 174 are closed and a reduced pressure is applied through nipple 175 until the pressure conditions within spool piece 171 are reduced to those pressure conditions within the auger housing 91. At this time, valve 172 is opened and the solids fall from the pipe 31 into spool piece 171. Now, valve 172 is closed and valve 174 opens. These solids fall from spool piece 171 into discharge pipe 173 for any suitable disposal. For example, these solids can be packaged in drums or buried in a land fill, as is desired. After discharge of the solids from spool piece 171, valve 174 is closed and spool piece 171 is again evacuated. Now, valve 172 can be opened to receive another charge of dry oil-free solids from pipe 148. In this manner, valves 172 and 174 are operated in sequence so that the dry oil-free solids stored in pipe 148 are discharged continuously into pipe 173 without effecting the reduced pressure conditions within auger housing 91.

Figure 13:
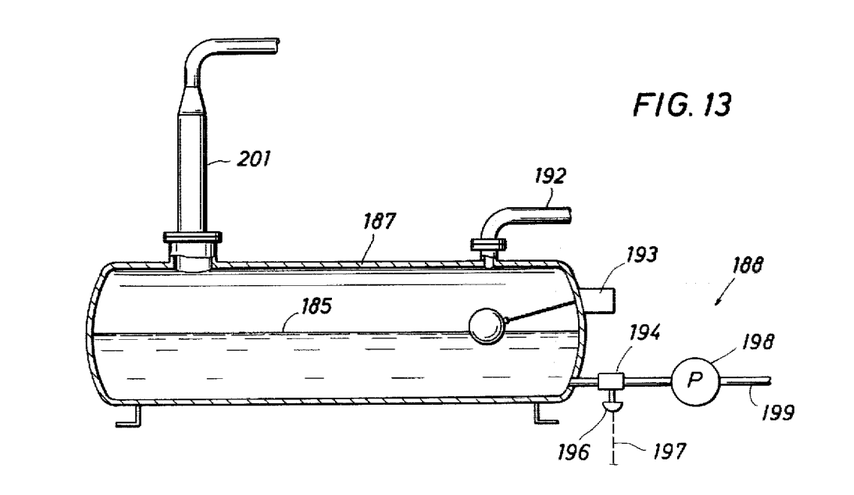
FIG. 13 is a schematic illustrating the liquid product discharge arrangement employed with the receiver shown in the dryer system of FIG. 1.

As shown in FIGS. 3 and 13, the cross 147 separates the vaporized materials, including condensible oil and moisture from the dry oil-free solids which are discharged into solids discharge unit 31. The vaporized materials are conducted through pipe 149 into the recovery unit 29 wherein these materials are condensed into a liquid product. In this regard, pipe 149 connects to a condensor 186, a receiver 187 and a liquid product discharge system 188. The condensor 186 may be of any construction such as a shell and tube arrangement, wherein the coolant such as water, is passed through an inlet 189 through the tubes therein and removed through an outlet 191 for suitable discharge or recirculation. The vaporized material in the condensor 186 is condensed into a liquid fraction at the reduced pressure conditions existing within auger housing 91. These liquid products are removed from the condenser 186 through a discharge pipe 192 and collected in liquid product receiver 187. The receiver 187 is maintained with a certain height 185 of liquid product therein by the periodic or continuous removal of the liquid product through the liquid discharge system 188.

The liquid product discharge system 188 includes a level controller 193 which senses the height 185 of the liquid product in the receiver 187. Whenever the height 185 reaches a predetermined level, the controller 193 opens a control valve 194 by signal 197 to an actuator 196. The signal 197 can be an electric or pneumatic function. At this time, controller 193 also actuates a displacement pump 198 which removes the fluid from receiver 187 and passes it into an atmospheric liquid product discharge line 199. In this fashion, the liquid product is removed from receiver 187 as desired to maintain a suitable level therein or for other reasons. The liquid product generally is predominantly oil (e.g., diesel oil) with small amounts of water. If desired, a pump drawoff can be provided the receiver 187 to separately discharge oil and water phases.

The receiver 187 also serves as a common source for application of vacuum to the entire dryer system 26. More particularly, a vacuum outlet or connection 201 is connected to the top of receiver 187. A suitable vacuum source, such as steam eductor or mechanical vacuum pump is connected to connection 201. The vacuum source should provide for sufficient reduced pressure capacity for maintaining the auger housing 91 at not less than, about 28 inches of mercury (or between about, 30-31 feet of water) of reduced pressure below atmospheric. At these conditions, the oily materials are removed readily and substantially completely from the cuttings passed through vacuum distillation part 28. In addition, these reduced pressure conditions combined with a temperature not substantially above 450° F. in the cuttings during their passage in the unit 28 will (1) produce removal of substantially all hydrocarbons from the solids product and (2) prevent any thermal degradation of the oil values so that they are recovered in substantially their original form. As a result, these recovered hydrocarbon values include any detergents or surfactants and other chemicals in their original form. If desired, these materials can be reused directly in the formulation of additional quantities of oil base drilling muds. Alternatively, the hydrocarbon values can be supplied to inlet 37 of burner 36 so as to provide the heat source for heating unit 27 of present dryer system 26.

An additional advantage resides in the receiver 187 being the common vacuum source for the entire dryer system 26.

The hydrocarbon values are condensed within condensor 186 under low pressure and relatively low temperature conditions, and they are not thermally degraded. Should air inadvertently enter the auger housing 91 or condensor 186 no explosions can occur. It will be remembered, for hydrocarbon vapors to ignite, not only must an oxidizing medium be present, but also the gases must be at elevated temperature substantially above about 900° F. Otherwise, there can be no danger of explosion. These conditions can not exist within the condensor 186 or the reduced pressure portions of the dryer system. Thus, the dryer system 26 operates at an optimum safety level.

In addition, it will be apparent that as the oily cuttings move from inlet 126 towards the outlet end of auger housing 91, they are being raised in temperature through the action of the heat exchange fluid passing through the heat exchanger jacket 92. As the hydrocarbon and moisture materials are vaporized, they are moved jointly towards outlet system 146 in conjunction with the cuttings. The application of a common vacuum source to receiver 187 provides for the concomitant flow of the vaporized materials with the drill cuttings. At the time the deoiled and dehydrated drill cuttings solids reach cross 147, the hydrocarbon vapors and moisture are at an optimum equilibrium condition relative to the heated solids, and therefore, the gases and solids separate readily in cross 147. Thus, no sophisticated gas-solid phase separators are required in the dryer system 26.

There is another significant advantage of this arrangement, in a common vacuum connection. Oil vapor released from the drilling cuttings must move towards the heated end of the auger housing 91. Therefore, hydrocarbons can not condense in the cold portions of the auger housing 91. The coldest portion at auger housing 91 is immediately adjacent inlet 126 where little hydrocarbon vapor exists. In addition, the concomitant flow of vaporized materials with the increased heating of the cuttings provides for a reduction to a minimum in thermal degradation of the oil values contained in these cuttings. Also, a minimum of noncondensibles are produced which must be withdrawn from the receiver 187 through the vacuum connection 201. As a result, the work load upon the vacuum source is reduced to a minimum.

The dryer system 26 is arranged to operate in a fail-safe manner. There are three primary hazards which could exist in such a system, especially on offshore platforms. The first hazard is the possibility of inducing combustible gases into heating unit 27. The second hazard is the possibility of combustion taking place in the vacuum distillation unit 28. The third hazard is a possibility of flooding the vacuum distillation unit 28 with water from the solids discharge unit 31. For all these hazardous possibilities, there is provided an automatic safety system to operate the dryer system 26 in a fail-safe manner.

The hazard of combustible gases entering heating unit 27 has been prevented in the air system shown in FIG. 8 through the use of the flame suppressors at inlet 76 and the flame suppressors 82 and 83 at inlets 38 and 42 for the burner and quenched air sources, respectively.

In addition, the operation of heating unit 27 is so arranged that burner 36 and firebox 33 operate in a fail-safe fashion. At the occurance of any hazard the burner is shut down, and both the burner 36 and firebox 33 are purged of all heated and combustible gases by the flows of burner and quench air.

The hazard of combustion within the vacuum distillation unit 28 can occur only if oxygen or air is introduced into auger housing 91, such as by the loss of the vacuum conditions. For this purpose, the fail-safe system floods the interior of the auger housing 91 with a non-combustible gas such as carbon dioxide.

Should the hazard be suffered that water does enter the vacuum distillation unit 28, the volume of the drill cuttings contained in the auger housing 91 relative to its size and strength is relatively small. Therefore, the system can absorb the initial amounts of generated steam without injury. Simultaneously, burner 36 is shut down and both it and the firebox 33 are purged with air which cause an immediate temperature reduction in heat exchanger jacker 92. The blower 78 is preferably operated continuously from a power source independent of busses 203 and 204.

Figure 14:
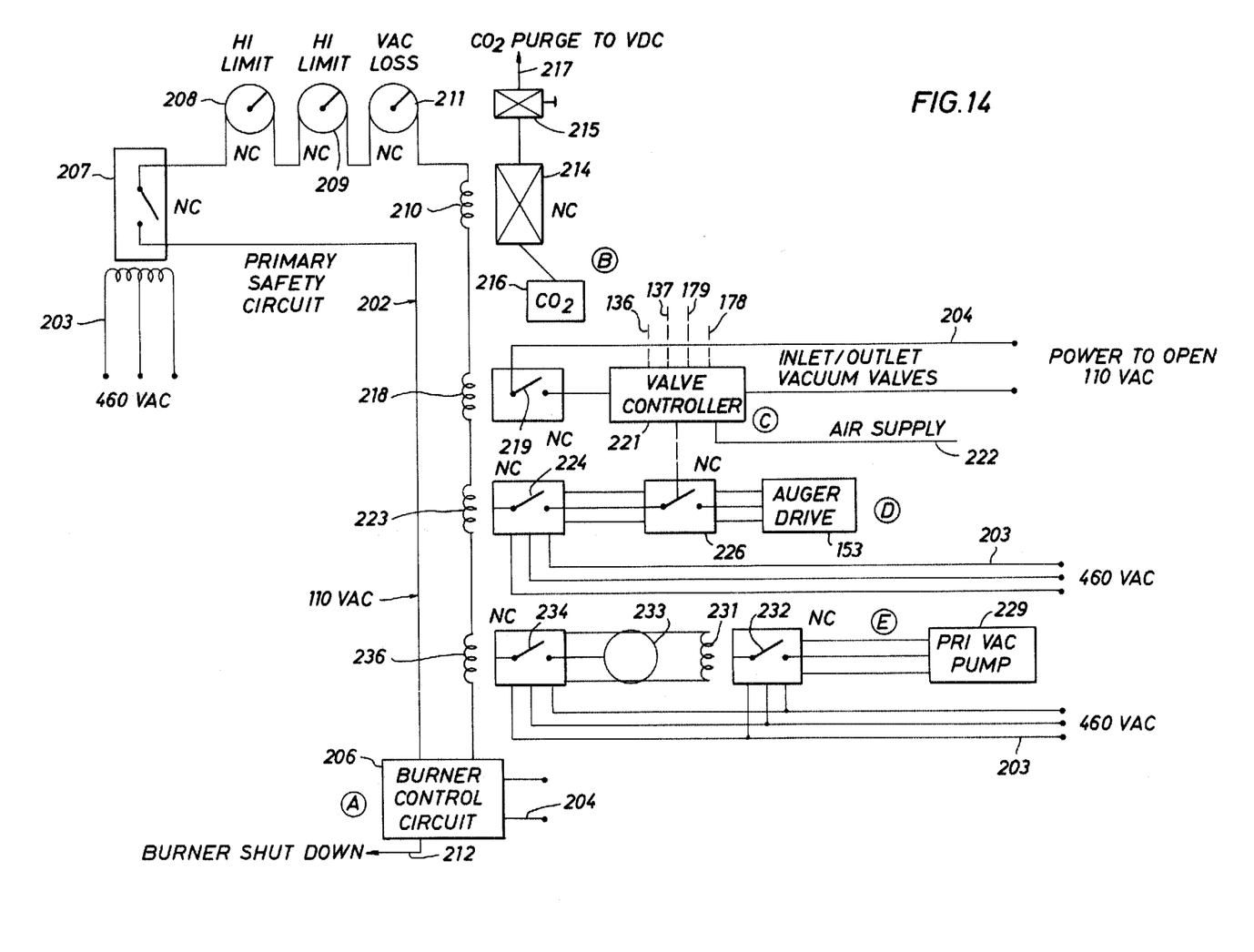
FIG. 14 is a schematic showing the fail-safe control circuit employed in connection with the present dryer system.

In one embodiment, the present dryer system 26 is provided with the fail-safe control system as is shown in FIG. 14. The primary safety circuitry is connected directly to the existing burner control circuit 206. In this regard, it will be assumed that the electrical power supplied to dryer system 26 will be 440 volts ac (3 phase) and 110 volts ac (single phase). These sources are shown at several different points in the FIG. 14 wherein one bus system 203 supplies the 3 phase 440 volts ac and a second bus system 204, within control circuit 206, supplies the 110 volts ac single phase power. to the primary safety circuit. The primary safety circuit operates from a 110 volts ac and includes in series, a contactor 207 which senses the presence of the 440 volts ac power on bus 203, a high limit firebox temperature switch 208, a high limit vacuum distillation part switch 209 and a vacuum distillation part vacuum loss switch 211.

The primary safety circuit includes this plurality of normally closed (nc) switches in series to provide an electrical signal for actuation of several fail-safe control functions upon occurance of a loss of either of the electric power on the busses 203 and 204, or upon a certain hazardous operating condition.

More particularly, the primary safety circuit 202 includes the contactor 207 which operates in the normal closed condition whenever bus 203 is energized with the 440 volts ac power. In addition, the high limit switch 208 senses the firebox temperature and should it rise to an excessive level, this switch will open. The switch 209 senses the temperature within vacuum distillation unit 27 and opens at excessive temperatures. The switch 211 senses the vacuum conditions within the vacuum distillation unit 27 and will open should there be a loss of vacuum within the auger housing 91.

The primary safety circuit includes the burner control circuit 206 which is adapted to provide the signal 212 to shut down the burner 32. The air blower 78 which supplies the burner and quench air flow is powered from a separate circuit. In addition, the primary safety circuit 202 includes a solenoid 210 to actuate a normally closed (nc) valve 214 that is connected to a supply of carbon dioxide 216 so that upon a hazardous condition, a flow of carbon dioxide is passed through an interconnecting conduit 217 to purge the auger housing 91. A manually operated valve 215 may be placed within conduit 217, if desired. The solenoid 210 operates whenever any of the switches 207, 208, 209, or 211 are opened by the occurance of a hazard signal or failure of a primary power function. In addition, the circuit 202 includes a contactor 218 which actuates a normally closed (nc) switch 219 to close various valves associated with the inlet and outlet of the vacuum distillation unit 27.

The switch 219 is employed for operating the various pneumatic valves associated with the cutting inlet and dry solids outlet associated with vacuum distillation unit 27. For this purpose, controller 221 terminates the electrical power or signals 136, 137, and 178 and 179 to the several actuators associated with valves 131, 132, 172 and 174. As a result, an occurance of a hazardous condition or failure of the primary power supply for the dryer system 26 will result in these several pneumatic valves being moved into the closed position. Controller 221 also provides a mechanical signal to switch 226. In the event of low air pressure from conduit 222, valves 131, 132, 172 and 174 will lock out in the closed position. Simultaneously, controller 221 will initiate a mechanical signal to open switch 226 and stop the auger drive 153. Another contactor 223 is included in the primary control circuit 202 and operates a normally closed (nc) switch 224 to stop the prime mover 153 from rotating the auger within housing 91. With this arrangement, the termination of the 460 volts ac power on bus 203 or the 110 volts ac power on bus 204 immediately terminates the power to the prime mover 153 which rotates auger 141 within the auger housing 91.

In addition, the primarly safety circuit 202 also includes a system for controlling the operation of the vacuum pump 229 which is the source of the reduced pressure for the system. For this purpose, a contactor 231 is employed to operate the normally closed (nc) switch 232 which connects the primary 460 volts ac power from bus 203 to vacuum pump 229. Preferably, there is provided a time delay switch 233 in series with the contactor 231 so that vacuum pump 229 is not shut down immediately upon an occurrence of a hazardous condition as detected by the several switches 208, 209, and 211. For example, should there be a high limit temperature signal applied to the switch 208, the burner control circuit 206 will shut down the burner 36 and provide for the purging flow of air into the burner housing 32 and firebox 33. However, the vacuum pump operates for an additional period of time. As a result, the reduced pressure conditions within the auger housing 91 will be maintained for a period of time necessary to safely shut in dryer system 26.

The vacuum pump 229 receives power through the switch 232 from bus 203. Switch 234 of the normally open (no) type, is operated by a contactor 236. The contactor 236 receives power from bus 204 of the burner control circuit 206. With this arrangement, it will be apparent that should the 110 volts ac power fail on bus 204, contactor 236 will be de-energized and the switch 234 closed. However, the contactor 231 will not be energized immediately, but through a time delay provided by a time delay switch 233. Generally, the time delay switch 233 which is associated with vacuum pump 229 need not provide an extremely long time delay, but merely one of less than a few seconds. Thus, the time delay switch 233 associated with the contactor 231 will provide for maintaining the operating power to vacuum pump 229 for a certain predetermined time after the remainder of dryer system 26 is shut down. As a result, the system is cooled and placed under full vacuum in a fail-safe condition before vacuum pump 229 is de-energized.

In summary, should switches 208, 209 or 211 be opened such as in the occurrence of high temperatures within firebox 33 or auger housing 91, or loss of vacuum in auger housing 91, the following events A-E will occur; (A) the controller 206 shuts down burner 36 and causes flow of air through burner housing 32 and firebox 33 for purging purposes; (B) solenoid valve 214 provides a flow of carbon dioxide directly through auger housing 91 so as to provide an inert atmosphere so no explosive mixtures can be produced; (C) contactor 218 through switch 219 closes the loading and discharge valves associated with the oily drill cuttings inlet and the dry solids outlet at the auger housing 91; (D) contactor 223 causes switch 224 to operate and thereby terminate the power to auger drive 153 and stop rotation of the auger 141; and (E) after a sufficient time delay established by timer switch 233, the primary power is terminated to vacuum pump 229.

In the event, that electrical power is lost upon bus 203 or 204, the following sequence of events will occur. For example, the 110 volts ac power is lost on bus 204. At this time, solenoid valve 215 is opened and the supply of carbon dioxide gas from source 216 is passed through conduit 217 and into auger housing 91 to avoid an explosive atmosphere such as caused by entry of air. In addition, the controller 206 shuts down burner 36. The controller 221 causes the motor valves associated with the inlet and outlet systems of auger housing 91 to be automatically closed. Simultaneously, contactor 223 causes the termination of the electric power to auger drive 153. After a suitable delay, provided by the time delay switch 233, the primary power to the vacuum pump 229 is terminated. Thus, it will be seen that all of the operating units of dryer system 26 are so arranged to be placed into the fail-safe system arrangement in the event of a power loss on either buses 203 or 204. In addition, a failure of the 440 volts ac power produces the same sequence of safe shut down events to occur as was programmed for a 110 volts ac power failure on bus 204 with the exception of the delayed shut down of the primary vacuum pump. In this instance, the primary vacuum pump will shut down immediately.

In the event of a failure of the air supply upon the conduit 222, the valves 131, 132, 172 and 174 will automatically be closed, and auger drive 153 will be de-energized through switch 226. Thus, in no event can dryer system 26 suffer a malfunction other than to be placed into a failsafe condition. In all cases, air blower 78 will remain operational to provide air flow to burner housing 32 and fire box 33. Due to the fact that it is powered by a completely separate 440 vac circuit.

From the foregoing description it will be apparent that there has been provided a novel dryer system for the treatment of oily drill cuttings which provides for their convenient and safe conversion into oil-free dry solids and a recovered liquid which includes oil values. It will be understood that certain changes or alterations in the present system may be made without departing from the spirit of this invention. These changes are contemplated by and or within the scope of the appended claims which define the present invention. Additionally, the present description is intended to be taken as an illustration of this invention.

What is claimed is:

1. A dryer system for converting cuttings from oil based drilling muds into pollution-free solids and oil containing condensibles, comprising:
   (a) an elongated chamber with an inlet at one end and an outlet at the other end;
   (b) means for continuously feeding the cuttings through a vacuum lock into the inlet of said chamber;
   (c) conveyor means for moving the cuttings from said inlet to said outlet of said chamber while continuously agitating the cuttings;
   (d) indirect heat exchange means surrounding said chamber and adapted to pass a heated fluid in contact with the exterior of said chamber from the outlet end to the inlet end whereby the cuttings at the outlet end have been heated to a substantially elevated temperature without thermal cracking of said hydrocarbons;
   (e) vacuum means for reducing the fluid pressure within said chamber to a magnitude sufficient to vaporize substantially all of the hydrocarbons carried by the cuttings at the elevated temperature conditions at the outlet end of said chamber; and said vacuum means removing fluids from said outlet of said chamber whereby vaporized liquids flow concurrently with the cuttings toward said outlet of said chamber;
   (f) means for continuously removing heated cuttings in a hydrocarbon-free condition through a vacuum lock from said outlet of said chamber; and
   (g) receiver means for collecting vaporized hydrocarbon and condensing same into a liquid product at said outlet of said chamber.

2. The dryer system of claim 1, wherein the cuttings in said chamber are heated to an elevated temperature not in excess of about 450° F. and said vacuum means to reduce fluid pressure and maintain said chamber at about 28 inches of mercury below atmosphere.

3. The dryer system of claim 1, wherein said inlet receives the cuttings through said vacuum lock provided by means including an inlet conduit sealed selectively at its ends by upstream and downstream valves whereby cuttings enter said inlet conduit with said upstream valve open and said downstream valve closed by controller means, then, both said valves are closed and said conduit is evacuated by said means for reducing fluid pressure to the pressure condition in said chamber, and then, said downstream valve is opened discharging the cuttings into said chamber at said inlet.

4. The dryer system of claim 3, wherein said control means sequence said upstream and downstream valves, whereby the cuttings are fed continuously to said inlet of said chamber at the same reduced fluid pressure as exists in said chamber.

5. The dryer system of claim 1, wherein said outlet is connected to said vacuum means for reducing the fluid pressure through said receiver means for collecting and condensing the vaporized hydrocarbons.

6. The dryer system of claim 1, wherein said outlet discharges said cuttings in a heated and hydrocarbon-free condition from said chamber through said vacuum lock provided by means including an outlet conduit sealed at its ends by upstream and downstream valves, the heated cuttings enter said outlet conduit with said upstream valve open and said downstream valve closed by control means, then, said upstream valve is closed and said downstream valve is opened and the heated cuttings are discharged from the dryer system to a suitable disposal; after which, said downstream valve is closed and said outlet conduit evacuated by said vacuum means for reducing fluid pressure to the pressure conditions in said chamber, and then said upstream valve again is opened to receive more heated cuttings for discharge from the dryer system.

7. The dryer system of claim 6, wherein control means sequence said upstream and downstream valves in said outlet conduit whereby heated cuttings are discharged continuously to the atmosphere.

8. The dryer system of claim 1, wherein said outlet of said chamber connects to a riser conduit extending downwardly to a venturi receiving an operating flow of water so that a column of water stands at a predetermined height in said riser, and the heated cuttings from said chamber are discharged into the water in said riser and then removed through said venturi by the flow of water for discharge from said dryer system.

9. The dryer system of claim 8, wherein said chamber is at a reduced pressure of 28 inches of mercury and said venturi operates a slightly less reduced pressure whereby the column of water in said riser conduit is several feed in height.

10. The dryer system of claim 1, wherein said receiver means for collecting and condensing vaporized hydrocarbons from said chamber includes a water cooled heat exchanger and a liquid storage receiver assembly to retain the liquid product.

11. The dryer system of claim 10, wherein said heat exchanger is a vertically mounted, u-tube shell and tube condensor receiving vaporized hydrocarbons released about 450° F. at an inlet on the shell side and providing at its discharge a liquid product at between 75° F. and 100° F.

12. The dryer system of claim 11, wherein said vacuum means for reducing pressure connect to said receiver means which retains the liquid product of said heat exchanger.

13. The dryer system of claim 10, wherein said receiver means is a cylindrical holding tank provided with a level controller and a liquid product discharge pump actuated by said controller to remove the liquid product to atmospheric discharge.

14. A dryer system for converting cuttings from oil based drilling muds into polution-free solids and oil containing condensibles, comprising:
 (a) an elongated chamber with an inlet at one end and an outlet at the other end;
 (b) means for continuously feeding the cuttings through a vacuum lock into the inlet of said chamber;
 (c) conveyor means for moving the cuttings from said inlet to said outlet of said chamber while continuously agitating the cuttings;
 (d) indirect heat exchange means surrounding said chamber and adapted to pass a heated fluid in contact with the exterior of said chamber from the outlet end to the inlet end whereby the cuttings at the outlet end have been heated to a substantially elevated temperature without thermal cracking of said hydrocarbons;
 (e) vacuum means for reducing the fluid pressure within said chamber to a magnitude sufficient to vaporize substantially all of the hydrocarbons carried by the cuttings at the elevated temperature conditions at the outlet end of said chamber; and said vacuum means removing fluids from said outlet of said chamber whereby vaporized liquids flow concurrently with the cuttings toward said outlet of said chamber;
 (f) means for continuously removing heated cuttings in a hydrocarbon-free condition through a vacuum lock from said outlet of said chamber;
 (g) receiver means for collecting vaporized hydrocarbon and condensing same into a liquid product at said outlet of said chamber; and
 (h) said outlet of said chamber connected to a vertical riser pipe leading downwardly to a water seal and having a height sufficient to balance the reduced pressure in said chamber by a water column and the heated cuttings from said chamber are discharged into said riser pipe and fall into the water column.

15. The dryer system of claim 14, wherein, said riser pipe is sufficient in length to accomodate a water column of about 31 feet.

16. The dryer system of claim 14, which system is mounted on a supporting platform standing in water and said riser pipe extends downwardly from said outlet into water.

17. The dryer system of claim 15, wherein the riser pipe has a length of at least 35 feet from the water to the lowest portion of said outlet.

18. A dryer system for converting cuttings from oil based drilling muds into pollution-free solids and oil containing condensibles comprising:
 (a) an elongated tubular chamber with an inlet and an outlet at opposite ends thereof;
 (b) means for continuously feeding the cuttings into said inlet of said chamber;
 (c) conveyor means for moving the cuttings from said inlet to said outlet of said chamber;
 (d) vacuum means connected to said outlet for reducing the fluid pressure within said chamber to a magnitude sufficient to vaporize substantially all of the hydrocarbons carried by the cuttings at said outlet of said chamber;
 (e) means for continuously removing heated cuttings in a hydrocarbon-free condition from said outlet of said chamber;
 (f) receiver means for collecting vaporized hydrocarbons and condensing same into a liquid product at said outlet of said chamber;
 (g) a heat exchanger jacket extending longitudinally about said chamber forming a cylindrical annulus through which heated fluid can pass in indirect heat exchange relationship relative to the cuttings in said chamber; and
 (h) heater means for supplying heated fluid to said heat exchanger jacket.

19. The dryer system of claim 18, wherein said heater means supplies a non-combustible gas at a temperature not above about 900° F. to said heat exchanger jacket.

20. The dryer system of claim 19, wherein the non-combustible gas is at a temperature below the auto ignition temperature of diesel oil-like hydrocarbons.

21. The dryer system of claim 18, wherein said chamber carries a plurality of radial fins extend longitudinally within said cylindrical annulus within said heat exchanger jacket whereby the heat transfer from the heated fluid to said chamber is enhanced.

22. A dryer system for converting cuttings from oil based drilling muds into pollution-free solids and oil containing condensibles comprising:
 (a) an elongated tubular chamber with an inlet and an outlet at opposite ends thereof;
 (b) means for continuously feeding the cuttings into said inlet of said chamber;
 (c) conveyor means for moving the cuttings from said inlet to said outlet of said chamber;
 (d) vacuum means connected to said outlet for reducing the fluid pressure within said chamber to a magnitude sufficient to vaporize substantially all of the hydrocarbons carried by the cuttings at said outlet of said chamber;
 (e) means for continuously removing heated cuttings in a hydrocarbon-free condition from said outlet of said chamber;
 (f) receiver means for collecting vaporized hydrocarbons and condensing same into a liquid product at said outlet of said chamber;
 (g) a heat exchanger jacket extending longitudinally about said chamber forming a cylindrical annulus through which heated fluid can pass in indirect heat exchange relationship relative to the cuttings in said chamber;

(h) heater means for supplying heated fluid to said heat exchanger jacket; and (i) said heat exchanger jacket sealed against heated fluid loss at its ends to said chamber, and one end of said heat exchange jacket sealed to said chamber by an expansion joint to compensate for differential thermal expansion therebetween.

23. The dryer system of claim 18, wherein the heated fluid passes counter-currently through said heat exchanger jacket relative to the movement of cuttings in said chamber.

24. The dryer of claim 22, wherein said expansion joint is provided by a flange secured to said chamber and said expansion joint carries an axial projecting cylindrical thimble, and said thimble is received in a sliding connection within one end of heat exchanger jacket.

25. The dryer system of claim 22, wherein said heat exchanger jacket carries an internal sleeve of refractory insulation and said thimble on said flange carries an external sleeve of refractory insulation adapted to telescope into said internal sleeve arrangement in said expansion joint.

26. The dryer system of claim 18, wherein said heater means for supplying heated fluid to said heat exchanger jacket includes a direct fired gas heater comprising;

(a) a cylindrical firebox lined with refractory and having a tangential air inlet;

(b) a forced draft burner receiving a supply of fuel and combustion air from a safe zone for producing a flame within said firebox;

(c) quenching air from the safe zone introduced through said tangential inlet to spiral about the flame and reduce the temperature of the resultant combustion products to less than the auto ignition temperature of diesel oil-like hydrocarbon; and (d) and flame suppressors mounted at said firebox upstream of said burner in the flow of air from the safe zone.

27. The dryer system of claim 26, wherein said burner uses diesel oil-like hydrocarbons as combustion fuel to produce a flame temperature of about 2200° F. and the quenching air spirals about the flame to produce resultant combustion products at a temperature not greater than about 900° F., which products are a safe heated fluid for passage through said heat exchanger jacket.

28. The dryer system of claim 18, wherein said chamber is arranged to contain an amount of cuttings in an unrestricted volume sufficiently large to contain the steam generated by the inadvertant entry of water into contact with heated cuttings in said chamber.

29. A dryer system for converting cuttings from oil based drilling muds into pollution-free solids and oil containing condensibles comprising:

(a) an elongated tubular chamber with an inlet and an outlet at opposite ends thereof;

(b) means for continuously feeding the cuttings into said inlet of said chamber;

(c) conveyor means for moving the cuttings from said inlet to said outlet of said chamber;

(d) vacuum means connected to said outlet for reducing the fluid pressure within said chamber to a magnitude sufficient to vaporize substantially all of the hydrocarbons carried by the cuttings at said outlet of said chamber;

(e) means for continuously removing heated cuttings in a hydrocarbon-free condition from said outlet of said chamber;

(f) receiver means for collecting vaporized hydrocarbons and condensing same into a liquid product at said outlet of said chamber;

(g) a heat exchanger jacket extending longitudinally about said chamber forming a cylindrical annulus through which heated fluid can pass in indirect heat exchange relationship relative to the cuttings in said chamber;

(h) heater means for supplying heated fluid to said heat exchanger jacket; and (i) an automatic purge system connected to said chamber for filling said chamber with an inert gas such as carbon dioxide should there be a loss of the reduced pressure condition therein with attendant risk of air encountering the hot cuttings.

30. The dryer system of claim 29, wherein fail safe means interconnect with said chamber so that in the event of a malfunction of any component in the system, all operative mechanisms are placed into the fail safe mode.

31. A dryer system for converting cuttings from oil based drilling muds into pollution-free solids and oil containing condensibles, comprising:

(a) an elongated chamber with an inlet at one end and an outlet at the other end;

(b) feed means for continuously feeding the cuttings into the inlet of said chamber;

(c) conveyor means for moving the cuttings from said inlet to said outlet of said chamber;

(d) indirect heat exchanger means including a heat source means adapted to pass a heated fluid in contact with the exterior of said chamber whereby the cuttings at the outlet end have been heated to an elevated temperature;

(e) vacuum means for reducing the fluid pressure within said chamber to a magnitude sufficient to vaporize substantially all of the hydrocarbons carried by the cuttings at the outlet end of said chamber; and said vacuum means removing fluids from said outlet of said chamber;

(f) discharge means for removing heated cuttings in a hydrocarbon-free condition from said outlet of said chamber;

(g) receiver means for collecting vaporized hydrocarbon from said chamber and condensing same into a liquid product;

(h) first signal means for sensing an excessive temperature in the heated fluid from said heat source means introduced into said heat exchanger means;

(i) second signal means for sensing an excessive temperature within said chamber;

(j) third signal means for sensing an increase in reduced pressure conditions within said chamber; and (k) primary control means associated with said first, second and third signal means to place into a fail-safe mode said chamber, said conveyor means, said heat source means and said vacuum means upon occurance of excessive temperatures in the heated fluid and said chamber or a loss of reduced pressure in said chamber.

32. The dryer system of claim 31, wherein said primary control means introduces a coolant into said heat source means; purges said chamber with an inert gas, stops functioning of said conveyor means, seals said inlet and said outlet against entry of atmospheric gases into said chamber, and continues operation for a preselected time period of said vacuum means.

33. The dryer system of claim 31, wherein said primary control means interconnects with said primary and secondary electrical power sources whereby a failure in either of said primary or secondary electrical power sources places into a fail-safe mode said chamber, said conveyor means, said heat source means and said vacuum means.

34. The dryer system of claim 31, wherein said heat source means is a burner producing the heated fluid by combustion of a hydrocarbon and air, and upon a failure in either of said primary or secondary electrical power sources, said primary control means terminates the flow of hydrocarbon to said burner and a flow of quenching air is introduced to said burner in the flame area normally produced by combustion of the hydrocarbon and air.

* * * * *